O. B. DUNCAN.
MOTOR SWITCH.
APPLICATION FILED MAY 6, 1912.
1,106,639.
Patented Aug. 11, 1914.
3 SHEETS—SHEET 1.
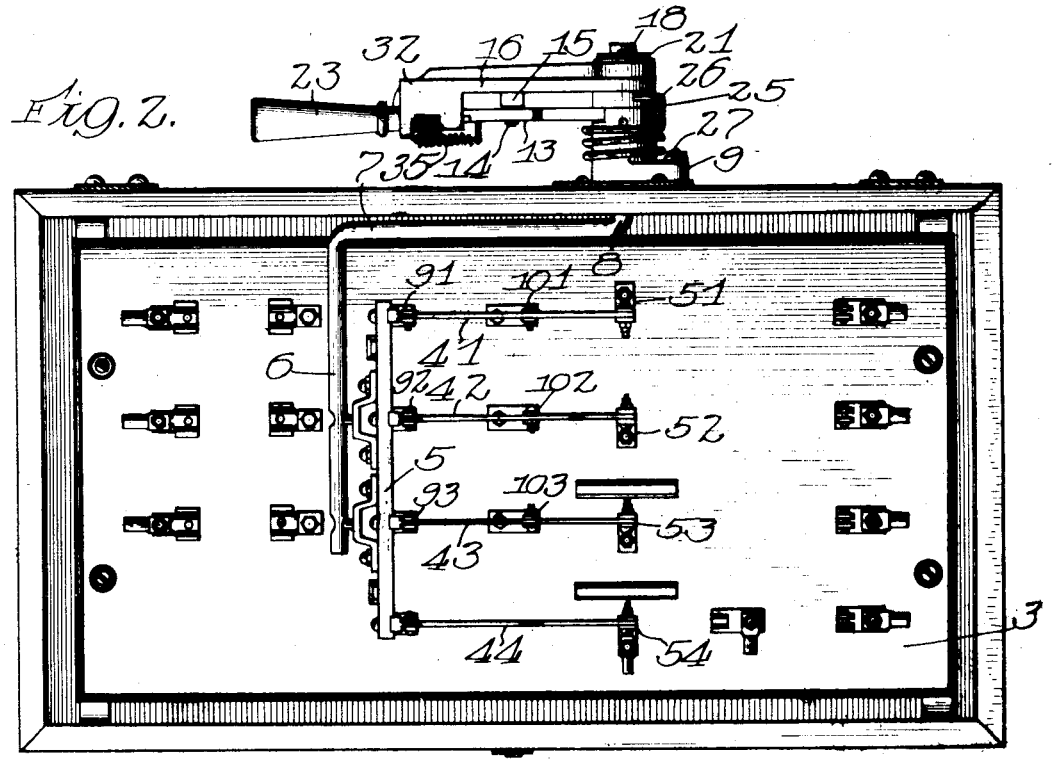
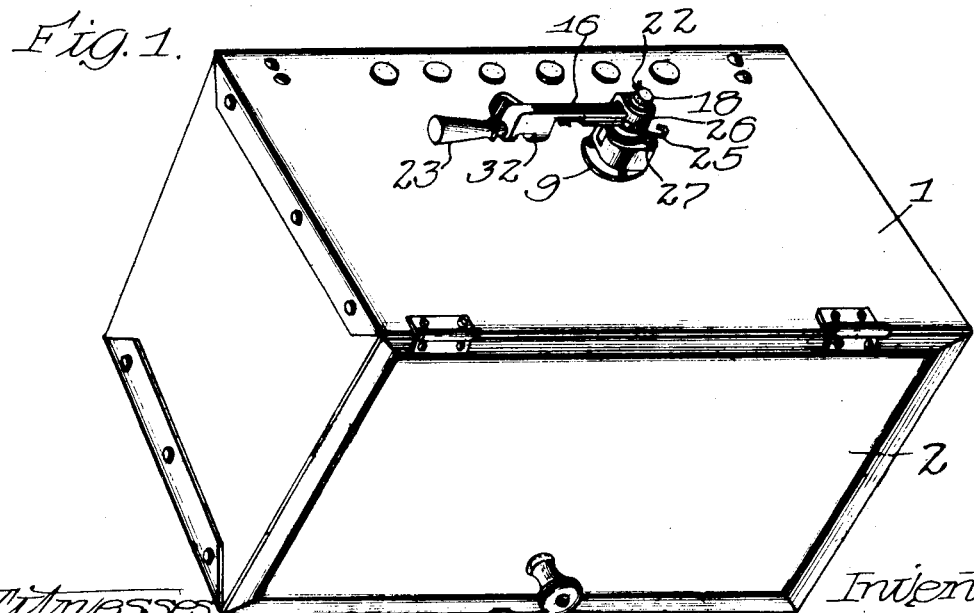
Witnesses
F. W. Bonarus Jr.
R. Bauerle.
Inventor
Otis B. Duncan
By Cheever & Cox
Attys O. B. DUNCAN.
MOTOR SWITCH.
APPLICATION FILED MAY 6, 1912.
1,106,639.
Patented Aug. 11, 1914.
3 SHEETS—SHEET 2.
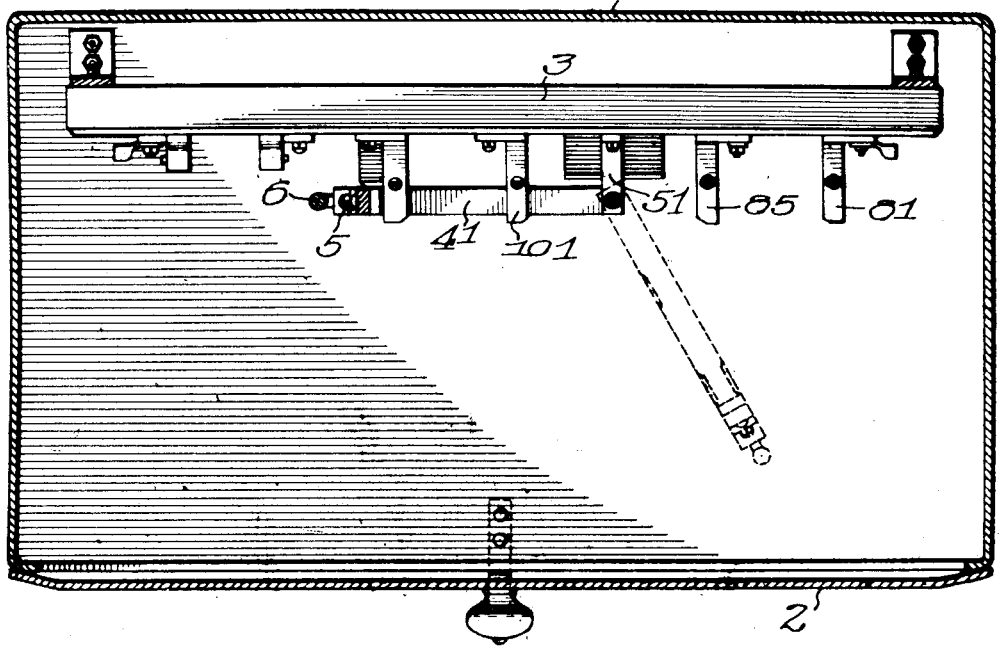
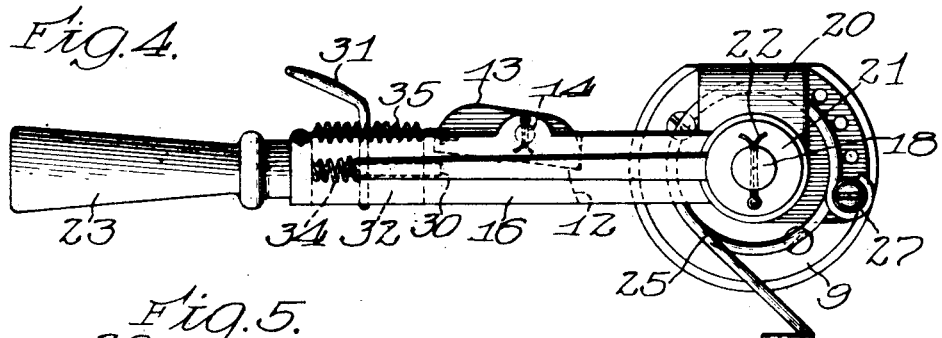
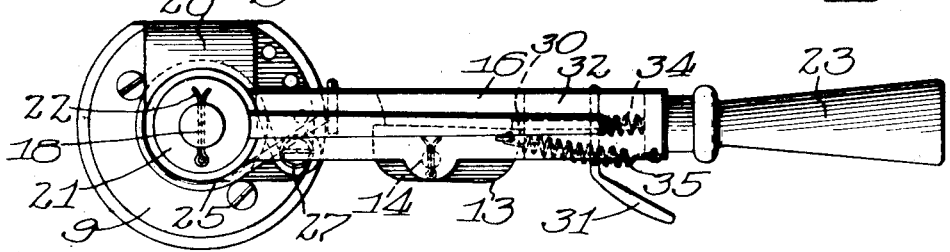
Witnesses:
G. W. Tomarius Jr.
R. Bauerle.
Inventor
Otis B. Duncan
By Cheever & Cox
Attys

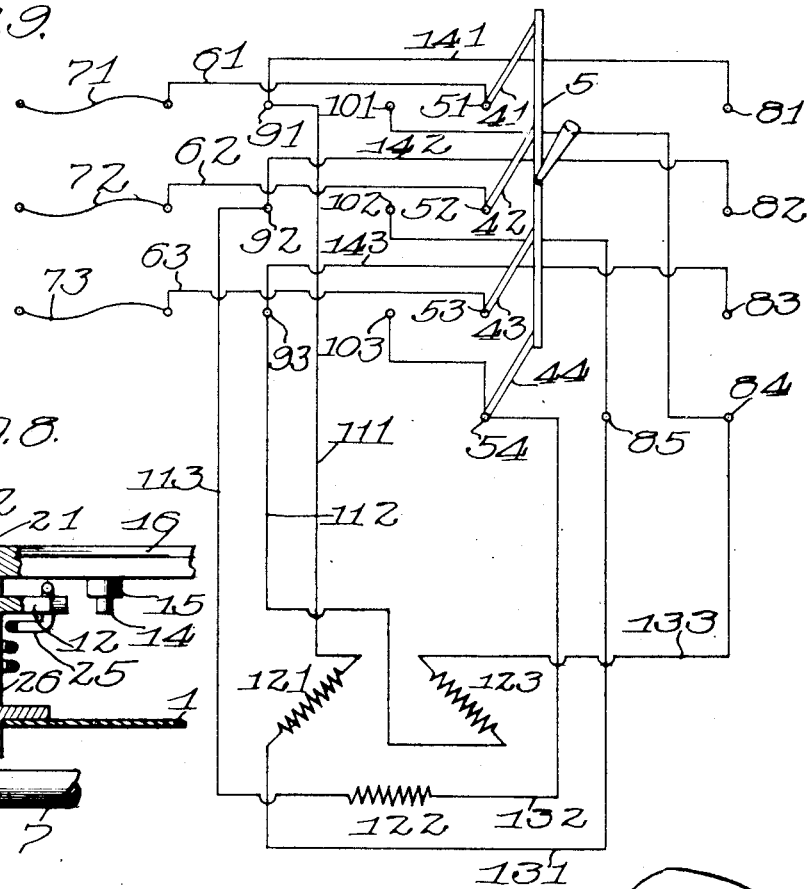
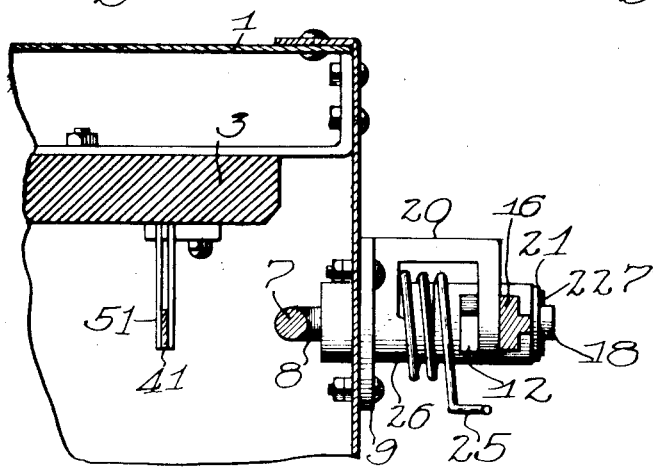
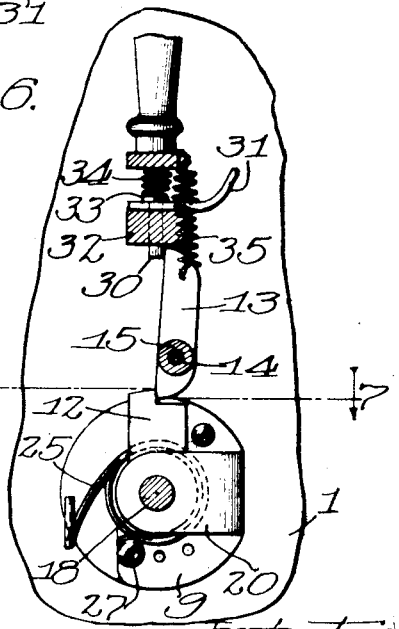

UNITED STATES PATENT OFFICE.

OTIS B. DUNCAN, OF CHICAGO, ILLINOIS, ASSIGNOR TO GEORGE CUTTER COMPANY, OF SOUTH BEND, INDIANA, A CORPORATION OF INDIANA.

MOTOR-SWITCH.

1,106,639.  Specification of Letters Patent.  Patented Aug. 11, 1914.

Application filed May 6, 1912. Serial No. 695,466.

*To all whom it may concern:*

Be it known that I, OTIS B. DUNCAN, a citizen of the United States, residing at Chicago, in the county of Cook and State of Illinois, have invented a certain new and useful Improvement in Motor-Switches, of which the following is a specification.

My invention relates to motor switches, more especially of the type appropriate for induction motors. In operating induction motors, it is common practice to provide two sets of contacts in the controlling switch, one set for starting and the other set for running. The reasons for this are well known, and need not be here explained.

The object of my invention is to provide means for producing a quick automatic movement of the switch blades from the starting to the running contacts as soon as the operator considers that the motor has attained sufficient speed to warrant the change. This quick movement prevents arcing and burning of contacts. It is common practice where motors are over five horse power, to bring out the ends of the phase windings and provide means whereby the windings may be star connected for starting the motor, and be then changed over so as to be delta connected after the motor has attained its normal speed. It is my purpose, and one of the objects of the invention, to accomplish this by the aid of a switch having but four poles, all of which are operable as a single piece.

Other objects of the invention are to provide certain contributing details which will be hereinafter more specifically described and claimed.

I obtain my objects by the mechanism illustrated in the accompanying drawings, in which—

Figure 1 is a perspective view of the inclosing cabinet and the operating lever on the top thereof. Fig. 2 is a front elevation of the apparatus with the front door removed. Fig. 3 is a plan section of the apparatus. Figs. 4 and 5 are plan views of the operating levers, showing changed positions thereof. Fig. 6 is a top view of the operating lever and associated parts. Fig. 7 is a sectional view on the line 7—7, Fig. 6. Fig. 8 is a fragmentary sectional view taken through the axis of the crank shaft. Fig. 9 is a diagrammatic view showing star delta connections for a three phase induction motor.

Similar reference characters denote like parts in the several views.

In order to explain the invention in its most complete, and one of its preferred forms, I have selected the form best adapted for a three phase induction motor started upon star connection and normally operated on delta connection; although it will be understood that the quick throw mechanism is adapted for any type of motor which is started on one set of contacts and normally runs on another set. It will also be understood that the stationary contacts may be wired up in other ways to suit different requirements and conditions.

In the form shown in the accompanying drawings, the panel switch blades and contacts are inclosed within a cabinet 1, having a front door 2 which in the present instance is hinged at the top. The panel 3, of slate or other suitable insulating material is fastened in any appropriate manner to the inside of the back of the cabinet. I will first describe the quick throw mechanism and therefore, it will be sufficient for the present to say that the switch blades are all connected to and simultaneously operated by a cross bar 5, of proper insulating material. Said bar is fastened to a crank consisting of an arm 6 connected to a crank proper 7, secured to a crank shaft 8 journaled in a bearing 9 bolted or otherwise fastened to the top of the cabinet, as best shown in Fig. 8. A setting arm 12 is pinned or otherwise fastened to said shaft on the top of the bearing in position to be engaged by a tripping pawl 13, as best shown in Fig. 6. Said pawl is pivoted upon a stud 14 extending downward from a boss 15 formed on the under side of an operating lever 16. Said lever has a stationary fulcrum concentric with shaft 8, and in the preferred construction the fulcrum consists of an arbor 18 screwed or otherwise fastened to an arm 20 formed integral with the bearing casting 9. Said lever is held in position by a washer 21 and cotter pin 22, or other suitable holding means. Lever 16 is furnished with a handle 23. The construction of these parts may, however, be considerably varied without departing from the spirit of the invention.

A strong spring 25 coils around the boss 26 of the bearing casting 9, and is held fast at one end, for example by the screw 27 screwing into said casting, as best shown in Figs. 2, 4 and 6. The free end of said spring engages and backs up the setting arm 12 in such manner as to tend to throw said arm and the shaft 8 and connected parts in a clockwise direction, Figs. 3 and 6. This throws the switch blades from the starting to the running contacts on the panel, as will hereinafter more fully appear. The arrangement of the parts is such that when pawl 13 and the lever on which it is mounted are swung in an anti clockwise direction, Fig. 6, said pawl will move the setting arm 12 with it against the force of the spring, but after the setting arm has been released, and the pawl has passed by it, a movement of the pawl in the opposite or return direction will produce no effect upon the said setting arm, the pawl merely sliding over the end of it by reason of the bevel upon the coöperating ends of the parts in question. The result is that the operating handle is incapable of moving the setting arm and switch blades toward the running contacts, such movement being produceable only by the actuating spring 25 which must first be strained by moving the switch blades over into engagement with the starting contacts. Thus the current connections are necessarily made in their proper order and the apparatus is incapable of misoperation. The importance of this will be obvious to those skilled in the art. Furthermore, as everything but the operating lever is inclosed, there is no danger from fire, and by locking the door the parts become inaccessible to an unauthorized person. Thus, as a result of my construction, the switch may be operated without exposing the parts, and at the same time the switch cannot be operated improperly.

The tripping pawl 13 is held to its work in rotating the setting arm 12 by trigger mechanism consisting of a pin 30 which normally engages said pawl, as best shown in Fig. 6, and is retracted by a trigger 31. Said pin is longitudinally movable in a lug 32 formed on the under side of lever 16. This pin has a head 33 formed on the side of the boss opposite to pawl 13 and is backed up and held in projected or acting position by a compression spring 34 which in turn is backed up by a portion of the lever itself. Between the pin head and the lug lies a portion of the trigger 31 which is apertured to receive said pin. The trigger is thus held in position by the pin and when manipulated by the thumb of the operator, retracts said pin and releases the pawl 13. Said pawl is yieldingly held in position to engage arm 12 by a tension spring 35 connected at one end to said pawl and at the other end to a portion of the lever.

In operation, the attendant first swings the operating lever 16 in a clockwise direction, Figs. 3 and 6, an amount sufficient to cause the tripping pawl 13 to engage the setting arm 12. He then rotates the arm in the opposite direction to the end of its throw, thus bringing the switch blades into engagement with the starting contacts. This action strains the actuating spring 25. The attendant holds the parts in this position until the motor has attained the necessary speed, whereupon he presses his thumb upon the trigger 31 which retracts pin 30 and releases the tripping pawl 13. This in turn releases the setting arm 12, whereupon spring 25 instantly throws the switch blades over into engagement with the running contacts. Acting under the force of the spring the movement of the switch blades is very quick, and consequently eliminates arcing and burning of the contacts.

It is desirable that the apparatus be constructed and mounted in such manner that the switch blades will swing in a horizontal plane, thus eliminating the effect of gravity in tending to open or close the switch. This characteristic, however, is not essential, and the actuating spring 25 may be made of proper strength to operate the switch blades moving in any plane.

I will now describe the arrangement of the contacts and switch blades whereby with a single throw of a four pole switch I am able to change a three phase induction motor over from star connecton to delta connection:

Attached to the cross bar 5, above mentioned, are four switch blades 41, 42, 43, 44. These are hinged to and in permanent electric connection with the contacts 51, 52, 53 and 54 respectively. Said contacts 51, 52, 53 and 54 are connected respectively by the conductors 61, 62, 63, and fuses 71, 72, 73, to the three main line conductors which supply the electrical energy. At the extreme right, in line respectively with the contacts 51, 52, 53 and 54, are contacts 81, 82, 83 and 84 which will be engaged by the switch blades when the latter are in starting position. A contact 85 is located between the contacts 54 and 84 in line to be engaged by blade 44 when the latter is in engagement with contact 84. At the left, in line respectively with the contacts 51, 52, 53, are contacts 91, 92, 93 and other contacts 101, 102 and 103. The contacts 91, 92 and 93 are respectively connected by conductors 111, 112 and 113 to one end of the phase windings 121, 122 and 123. The opposite ends of said windings are respectively connected to conductors 131, 132 and 133; the conductor 131 leading to the contacts 85 and 102; the conductor 132 leading to the contacts 54 and 103 and the conductor 133 leading to the contacts 84 and 101. Contacts 81 and 91 are connected by a conductor 141. Contacts 82 and 92 are connected by a conductor 142, and contacts 83 and 93 are connected by a conductor 143. By referring to the diagram it will be seen that when the switch blades are thrown to the right, the motor will be star connected, and that when thrown to the left, the motor will be delta connected, and the change is thus made by the aid of a switch having but four poles or blades and having but two acting positions.

Having thus described my invention, what I claim as new, and desire to secure by Letters Patent, is:

1. In an electric switch the combination with the stationary contacts and a switch blade adapted to be thrown from one contact to the other, of an actuating spring for throwing the blade, a setting arm for forcing back the blade against the force of the spring, a tripping pawl and means for operating said pawl, said pawl being adapted to engage said arm when moved in one direction and to slip over without engaging said arm when moved in the opposite direction.

2. In a motor switch, the combination of a starting contact, a running contact, a switch arm movable from one to the other, and quick throw mechanism comprising a spring adapted to move the switch arm toward the running contact, a handle adapted to move the switch arm toward the starting contact, and means for quickly releasing said spring, said handle being ineffective to move said switch arm toward the running contact.

3. In a motor switch, the combination of a starting contact, a running contact, a switch arm movable from one to the other, a spring adapted to move the switch arm toward the running contact, a rotary setting arm for controlling said switch arm, a lever fulcrumed concentrically with said setting arm, a tripping pawl adapted to move said setting arm in a direction to move the switch arm toward the starting contact, said tripping pawl being non-active upon said setting arm in the opposite direction, and a trigger mounted on said lever for controlling said tripping pawl.

4. In a switch, the combination with a movable switch arm, of a setting arm adapted to operate said switch arm, a spring adapted to move said switch arm in one direction, a tripping pawl adapted to move said setting arm in the opposite direction only, a trigger pin adapted to hold said tripping pawl to its work in moving the setting arm against the force of the spring, and a lever whereon said pawl and pin are mounted, said pawl and pin both being yielding, and the pawl being adapted to slip over without engaging the setting arm, and adapted to force back to non-acting position the pin when the operating lever moves the pawl and pin in the direction opposite to the one in which the pawl is capable of engaging the setting arm.

5. In a motor starting switch, the combination of a starting contact, a running contact, a pivoted switch arm adapted to swing from one to the other, a spring adapted to swing the switch arm toward the running contact, a setting arm concentric with the switch arm, an operating lever concentric with the switch arm and setting arm, a tripping pawl adapted to engage said setting arm to swing the switch arm toward the starting contact, said tripping pawl being yieldingly mounted and adapted to slip over the setting arm when moved in the opposite direction, a yieldable trigger pin adapted to engage said pawl to hold it to its work, and a trigger for retracting said pin to thereby suddenly trip said pawl.

6. In apparatus of the class described, the combination of a cabinet, an insulating panel therein, a starting contact and a running contact on said panel, a switch arm mounted on said panel, a spring adapted to move said arm into engagement with the running contact, a lever mounted on the cabinet on the outside thereof, means including a tripping pawl and pin mounted on said lever adapted to connect said lever with said switch arm to move the latter into engagement with the starting contact, and a trigger operative upon said pin for disconnecting the lever from the switch arm.

7. A three phase induction motor switch comprising a four pole switch arm having three "phase" blades permanently connected respectively to the three phases of the source of electric energy, and a fourth or "extra" blade normally insulated therefrom, three starting contacts adapted to be engaged respectively by the three "phase" blades of the switch arm when the latter is in starting position, three running contacts adapted to be engaged respectively by the three "phase" blades when the switch arm is in running position, the starting and running contacts for any "phase" blade being both connected to the same end of the same phase winding, three extra contacts connected respectively to the remaining ends of the three phase windings of the motor, said three extra contacts being adapted to be all engaged by the extra switch blade when the switch arm is in starting position to thereby short circuit the "inner" ends of the phase windings of the motor for throwing the same into star connection, and three contacts adapted to be engaged respectively by the three "phase" blades of the switch arm when the latter is in running position to be thereby short circuited with the three running contacts above mentioned to throw the phase windings of the motor into delta connection.

8. In an electric switch, the combination of a panel, a switch blade hinged thereto and adapted to swing in a plane at right angles to the plane of the board, contacts on said board on opposite sides of the hinge of the switch blade, said blade being adapted to be thrown from one contact to the other, an actuating spring for throwing the blade, a setting arm for forcing back the blade against the force of the spring, a hand lever, a tripping pawl on said lever adapted to move said setting arm in the direction to strain said spring, and trigger mechanism on said hand lever for controlling said tripping pawl.

In witness whereof I have hereunto subscribed my name in presence of two witnesses.

OTIS B. DUNCAN.

Witnesses:
 HOWARD M. COX,
 ETTA L. WHITE.